Figure 1:
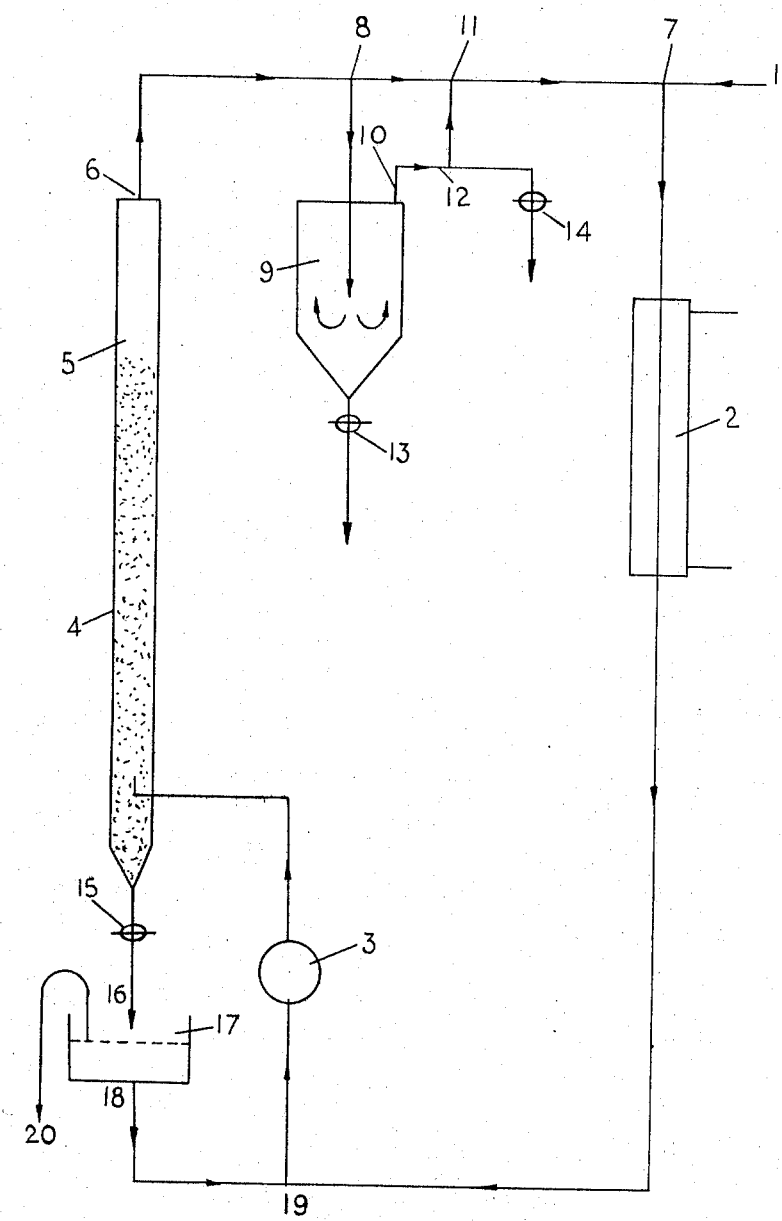

United States Patent Office 2,902,520
Patented Sept. 1, 1959

2,902,520

PROCESS FOR THE REFINING OR BENEFICIATION OF THE ISOMERS OF BENZENE HEXACHLORIDE

Robert Charles Chuffart, Widnes, England, assignor to Imperial Chemical Industries Limited, London, England, a corporation of Great Britain Application April 3, 1956, Serial No. 575,818

Claims priority, application Great Britain April 4, 1955

12 Claims. (Cl. 260—648)

This invention relates to a new process for the refining or beneficiation of the isomers of benzene hexachloride, and more particularly to a process for separating the gamma isomer from a mixture of the various benzene hexachloride isomers and concomitant impurities.

As is well known, the additive chlorination of benzene whether initiated by light or by chemical means (for example by organic peroxides or by aqueous alkali), gives rise to a mixture of the various isomers of benzene hexachloride, accompanied by small proportions of more highly chlorinated compounds. Of these various components of the crude reaction mixture, the gamma isomer, which is formed only in minor proportions, is a very valuable insecticide, the other components being relatively valueless, except as chemical intermediates. Accordingly, many processes have been devised for separating the gamma isomer from the accompanying unwanted isomers and impurities and a simple and efficient method of carrying out the separation is an important industrial objective.

In general, the known processes depend on bringing about the preferential crystallization of one or other component of the crude total chlorination mixture or of a primary concentrate obtained by elimination of a substantial proportion of the alpha and beta isomers. Such a concentrate can conveniently be made by continuing the chlorination of the benzene until a precipitate of alpha and beta isomers has formed and the mother liquor is approaching saturation with gamma isomer. Alternatively, the chlorination is interrupted at an earlier stage and solvent is then removed so as to produce a precipitate of alpha and beta isomers and leave a solution saturated with alpha and beta and almost saturated with gamma isomer. In either case, evaporation of the mother liquor yields the required primary concentrate.

The crystallization procedures customarily applied to the crude material or to this primary concentrate can be broadly separated into two groups, namely, those wherein the solids crystallizing out are in true equilibrium with the solutions from which they separate and those wherein the degree of separation achieved is governed, not by the relative solubilities at equilibrium of the various isomers, but by their respective rates of crystallization from solutions supersaturated in respect of more than one component of the mixture.

In the main, this latter group of processes employ the so-called "static crystallization" technique, which depends on the observation that from a solution supersaturated with alpha, beta and gamma isomers and containing also some delta isomer, which is cooled slowly and without agitation, the gamma isomer crystallizes first, the others remaining for some time in a metastable state of supersaturation. One such process, for instance, is described in British specification No. 573,693, wherein the crude total chlorination product is extracted at ordinary or elevated temperature with a limited amount of methanol or ethanol so that all of the gamma isomer, but only part of the alpha isomer is dissolved; this extract is then concentrated and cooled whereupon gamma isomer crystallizes from a solution that is evidently supersaturated with both gamma and alpha. However, processes such as these, which necessitate crystallization of large volumes of solution in the absence of vibration, clearly present inconveniences for large scale working.

The procedures based upon true equilibrium crystallization do not, it is true, present these difficulties, but if gamma isomer of more than about 70%–80% purity is required, they do necessarily involve the use of two solvents with radically different solubility characteristics—see, for instance, co-pending application No. 22,421/53.

It has now been found that the gamma isomer of benzene hexachloride can be readily and efficiently separated from a mixture containing at least the alpha and gamma isomers and, if desired, also other isomers and impurities formed during the chlorination reaction, by a process that is based on a different principle from those described above. It has been found that if a solution of such a mixture of isomers, of composition such that it is in the metastable field of supersaturation in respect of at least the gamma isomer, is allowed to crystallize under substantially isothermal conditions in the presence of a large surface of gamma crystals provided by a controlled number of particles of the gamma isomer that are distributed throughout the crystallizing solution, then there are formed large crystals of the gamma isomer but only small crystals of the alpha isomer or of the alpha and beta isomers, which large and small crystals can be efficiently separated by making the crystallization vessel serve also as a crystal classifier.

The invention thus broadly contemplates the separation of the gamma isomer of benzene hexachloride from a composite material comprising at least the alpha and gamma isomers and optionally also other isomers and/or impurities formed during the production of benzene hexachloride by additive chlorination of benzene, by a process which comprises causing a solution of the said composite material which is in a state of metastable supersaturation with respect to at least the gamma isomer, to flow upwardly through a crystallization vessel wherein it crystallizes substantially isothermally in the presence of a large surface of gamma crystals provided by a controlled number of particles of the gamma isomer that are maintained distributed throughout the crystallizing solution in a "fluidized" state by the upward flow of the said solution, the rate and manner of flow of the solution being so adjusted that the crystallization vessel also acts as a crystal classifier, so that fine crystals, mainly of the alpha isomer or of the alpha and beta isomers but also including some fine gamma crystals, are carried to the upper portion of the vessel whence they are withdrawn in the stream of spent solution, while relatively coarse crystals of highly purified gamma isomer collect in the lower portion of the vessel whence they are withdrawn as desired.

It will be appreciated that the successful separation of the gamma isomer in this way depends upon strict control of the conditions in which the crystallization takes place and particularly upon control of the number of crystallization nuclei present in the crystallizing solution. Hence it will be seen that the degree of supersaturation must be kept within the metastable field as that term was defined by Miers in the Journal of the Institute of Metals, 1927 vol. 37, p. 331; otherwise, of course, crystallization nuclei will appear spontaneously while the solution is passing through parts of the system preceding the crystallizing vessel and so the necessary control will be lost. From this it follows that in each crystallization there will be removed only a very small proportion of the gamma isomer contained in the solution, so that if the process is to be commercially useful it must be worked in a continuous or semi-continuous manner. We thus arrive at the concept of a system wherein a relatively large bulk of solution circulates in a substantially closed system wherein it is repeatedly subjected to a three-step cycle of operations involving (a) simultaneous crystallization and classification, (b) fortification of the spent solution with fresh material and (c) bringing the fortified solution to the requisite state of metastable supersaturation ready for passing forward again to the crystallization vessel, the fine and coarse crystals being appropriately removed from, respectively, the upper and lower portions of the vessel.

With benzene hexachloride, the solubilities of the alpha, beta and gamma isomers are sufficiently sensitive to changes in temperature that it is easy to produce the requisite degree of metastable supersaturation by cooling a circulating solution saturated in respect of at least the gamma isomer through a very small temperature range, suitably a fraction of a centigrade degree. However, other methods of achieving the requisite supersaturation may be used, for instance, removal by evaporation of part of the solvent, or a combination of the two methods wherein vacuum evaporation produces simultaneously both concentration and cooling.

A further possibility is to bring about the requisite evaporation of part of the solvent by passing a stream of air or other inert gas over or through the solution. Conveniently the gas stream is passed either co-current or counter-current over a film of the solution. Evaporation occurs and the gas-stream may become saturated with solvent vapor. It is then passed forward to a cooler where a portion of the vapor is condensed; this is collected and recycled to another portion of the system, while the gas stream is heated up again and recycled to the evaporator. Some heat must also be supplied to the solution to make up for that lost as latent heat of evaporation.

It is also possible to bring about the desired supersaturation by injecting into the circulating stream of saturated solution a quantity of another solvent, miscible with that already employed, but in which the benzene hexachloride isomers are less soluble. This, however, necessitates means for subsequently removing this extraneous solvent and tends to make the circulatory system somewhat complicated.

The means to be adopted for bringing about the crystallization in such manner that the crystallizer acts also as a crystal classifier are in themselves known; they are essentially those which have been described earlier in respect of processes for bringing about the controlled crystallization of inorganic salts from aqueous solutions. Convenient descriptions of these may be found, for example, in British specifications Nos. 392,829, 418,349, 457,301 and 616,351 and an article by Svanoe in Industrial and Engineering Chemistry 1940, vol. 32, p. 636.

The fortification of the spent solution is most readily brought about by injecting into the system a further quantity of a solution of the composite material which is both more concentrated and hotter than the main bulk of the circulating solution, or by passing the circulating solution or part thereof through a heating zone and then bringing it into contact with a source of a further quantity of the composite material, for instance, by passing it through a bed of crystals in an appropriate extraction vessel. In either case, subsequent passage of the fortified solution through a cooling zone will bring about the desired state of metastable supersaturation, or the supersaturation may be induced by one of the other methods described above.

The method adopted for the removal of the fine crystals is a matter of some importance because, of course, in a continuous process not all the fine crystals must be removed; some must be left to provide the requisite controlled number of crystallization nuclei on which the gamma, alpha and where appropriate, beta isomer present in supersaturation may be deposited. This controlled removal of fine crystals is conveniently achieved by dividing the stream that is withdrawn from the upper portion of the crystallization vessel and passing a portion thereof, usually a minor portion, through a vessel, conveniently termed a separator, wherein the speed of the current is considerably diminished, so that the bulk of the crystals settle out, the residual solution being then returned to the main stream, preferably before it is fortified. The proportion of the main stream thus diverted and denuded of crystals and, of course, the efficiency of the separator, are factors that can be varied to provide the requisite control of the concentration of crystallization nuclei present in the solution that is reintroduced into the crystallization vessel. An alternative is to use a cyclone as a means of separating the fine crystals from that portion of the stream that is diverted for this purpose. In other cases, particularly when large amounts of delta isomer are present in the solution, so that the zone of metastable supersaturation of the alpha and beta isomers is greatly increased and their rates of crystallization considerably diminished, it is preferable to use as separator a vessel containing a fluidized bed of alpha and beta particles.

The withdrawal of the purified gamma isomer from the lower portion of the crystallization vessel is simply achieved by intermittently or continuously tapping off, through an offtake preferably situated below the inlet for the feed solution, a proportion of the gamma crystals and solution, passing them to a sieve or filter that retains the coarser crystals and allows any that are not yet of the desired size to pass through with the solution, and returning the solution to the main stream. The crystals are preferably washed with a small proportion of solvent which can then be added to the main stream to make up for handling losses and deficiencies that occur in other ways now to be discussed.

For simplicity, the foregoing discussion has been limited to considering the handling and ultimate destination of the alpha, beta and gamma isomers, and nothing has been said of the fate of the delta isomers and chlorinated impurities which are usually also present in the starting material. These latter components are in general much more soluble than are the alpha, beta and gamma isomers, so that they do not interfere with a simple application of the process to produce substantially pure gamma isomer by a single extraction or by a short multi-cycle extraction from any source normally likely to be utilized. When, however, the process is operated continuously and run for a considerable number of cycles, the concentration of these components builds up progressively to a point where their effect may be deleterious. Increasing the concentration of delta isomer and impurities in the crystallizing solution increases the tendency of the alpha, beta and gamma isomers to remain in supersaturation and if this is allowed to proceed too far it may upset the delicate balance upon which the differentiation of the gamma isomer is based. Accordingly, provision must be made to prevent this concentration exceeding a predetermined value, the magnitude of which depends on factors peculiar to the particular system concerned such as the nature of the starting material and solvent and the degree of supersaturation utilized. A convenient arrangement is to bleed off as a purge a portion of the stream of spent solution, conveniently after removal of the fine crystals, the amount so withdrawn being controlled so as to carry away in unit time such amounts of delta isomer and impurities as are in that time introduced into the system by the feed solution. Clearly such a purge can be operated from the beginning of the process or can, if desired, be brought into operation only when the concentration of delta isomer and impurities has built up to a pre-determined value. The solution so withdrawn will not only contain delta isomer and impurities, but in addition will be saturated with gamma, alpha and probably also beta isomers and means may be adopted to recover these products and return the solvent to the circulating system; conveniently, the returned solvent may serve as the vehicle for the hot concentrated solution that, in one variant of the process, is used to fortify the spent solution.

As indicated above, an essential feature of the process, when run continuously, is the removal in the purge of the delta isomer and impurities at the same rate as they are introduced in the feed solution. Inevitably, but undesirably, this also carries gamma isomer (and alpha and beta isomers) out of the system. This effect can, of course, be minimized by first allowing the delta isomer to build up in the system so that the purge is not operated until the liquor is saturated with delta as well as with gamma isomer, the limiting factor in this direction being obviously the relative solubilities of the delta and gamma isomers in the particular solvent used. However, other factors also need consideration. Thus, increasing the delta concentration diminishes the rates of crystallization (for any given degree of supersaturation) of the gamma and more particularly of the alpha and beta isomers and this diminishes the throughput of the crystallizer or alternatively calls for a bigger crystallizer if the same throughput is to be achieved. Hence in practice these factors have to be balanced off one against another and a comprise reached that gives the optimum results for the particular system in question.

Other factors that must be similarly controlled if the gamma crystals produced are to be of regular shape and size and of high purity are the degree of supersaturation of the crystallizing solution and the amount and nature of the crystals of the alpha, beta and gamma isomers upon which the supersaturated material is deposited. Unfortunately, some of these factors are not very readily measured and since they are all interdependent and should to some extent be related also to the nature of the solvent used, definition, in other than general terms, is a difficult problem.

The degree of supersaturation of the crystallizing solution is obviously a major factor, since if this falls outside the metastable field, control of the crystallization process is impossible. Within that field, the efficiency of separation is greater the smaller the degree of supersaturation, but clearly too small a value is uneconomic as it calls for undesirably large vessels and volumes of circulating solution. On the other hand, excessive supersaturation increasingly causes inefficient separation of the gamma isomer, the gamma crystals appearing to agglomerate with the alpha and beta crystals, so that fine alpha and beta crystals that should pass away from the top of the vessel become cemented to one another and to gamma crystals, forming larger aggregates that fall to the base of the vessel and so contaminate the gamma product. Between these extremes there appears to be a progressive change so that the maximum degree of supersaturation that can be utilized in any given case depends on the degree of purity required in the product. Good results, yielding products of purity 95% to 99% gamma isomer have been obtained by arranging that the metastably supersaturated solution entering the crystallizer deposits as gamma crystals 0.1% of its total gamma content in each passage through the crystallizer. If desired, products of lesser purity can, of course, be made, in which case higher degrees of supersaturation can be tolerated.

Another controlling factor in the process is the available surface of alpha, of beta and of gamma crystals upon which the material present in supersaturation can be deposited. The aim is, of course, to produce crystals of the alpha and beta isomers considerably smaller than those of the gamma isomer since thereby the efficiency of separation from the latter is increased. On the other hand, if the alpha and beta crystals are too small, difficulties are encountered in separating them subsequently from the stream of circulating liquor. Good results have been obtained by maintaining in suspension an amount of alpha and beta crystals not exceeding 20 grams of solids per litre of circulating solution. As regards gamma crystals present in suspension in the crystallizer, the aim is, of course, to keep the proportion of fine crystals down to a minimum. At the same time, for any given degree of supersaturation and space velocity of the solution passing through the crystallizer, there is a minimum permissible value for the effective surface of gamma crystals that will be adequate to cause satisfactory release of the supersaturation. Again to give an example from small scale operation, with a methanol solution passing at the rate of 1,000 litres per hour through an effective crystallizing zone of volume 2.5 litres and depositing gamma isomer from supersaturation at the rate of 30 grams per hour, an appropriate surface is that provided by some 700–1,000 grams of gamma crystals of substantially uniform size such that they are just retained on a sieve that meshes of which are 2 mm. square.

The choice of solvent is another important factor. This is governed by numerous interdependent considerations some of which will be more conveniently examined following a detailed description of some practical embodiments of the process. For the moment, it will suffice to note that the solvent should be such that the solubilities of the isomers therein should not be too low or undesirably large vessels will be needed. Likewise, the solvent should not be too volatile or large losses by evaporation will be incurred. On the other hand, if its volatility is too low, recovery will be difficult; in particular, the temperature needed to distill off the solvent from the delta purge may be such as will lead to some decomposition. A particularly convenient solvent is methanol.

The broad principles of the invention having thus been described, the more detailed practice will now be illustrated by means of examples.

Referring to the accompanying drawings, Figure 1 shows a flowsheet for a process embodying a simple form of the invention. At the point 1 there is introduced into the circulating system a solution of benzene hexachloride isomers and concomitant impurities, for example, a solution of a primary concentrate, in such quantity and at such concentration and temperature that when mixed with the circulating stream it brings the latter to a state wherein it is saturated with the alpha, beta and gamma isomers at a temperature of $t°$ C. The stream then passes to the cooler 2 where it is brought to a slightly lower temperature, at which point, of course, it is in a metastable state of supersaturation with respect to the alpha, beta and gamma isomers. It then passes, via the pump 3, to the base of the classifying crystallizer 4 where it enters a body of liquor holding in "fluidized" suspension a mass of crystals. These are mainly gamma crystals, but there are also present, mainly in the upper regions, some alpha crystals and some beta crystals. The larger crystals are found, of course, near the bottom of the vessel, the size diminishing progressively as we move up the column. The rate of flow of the solution is adjusted so that the upper limit 5 of the fluidized bed is some way below the exit which is at the top of the vessel (6). In this vessel, most of the benzene hexachloride that is in supersaturation crystallizes out, being deposited mainly on the crystals already present. The gamma crystals grow big and as they grow they fall progressively lower in the column. The alpha and the beta crystals do not grow as far and so the rate of flow of the liquor can be adjusted so that they, together with a small proportion of the gamma isomer which has not progressed beyond the state of fine crystals, are carried with the stream out of the crystallizer at the point 6. This liquor stream, which is now only saturated or perhaps very slightly supersaturated with the three isomers, is, of course, recirculated, via the point 7 where it is fortified and heated by the new incoming hot concentrated solution, through the cooler and the pump 3, back to the base of the crystallizer.

At the point 8 the stream is divided, a minor proportion being passed into the separator or decanter 9 where the rate of flow is cut down so that the fine crystals of alpha, of beta and of gamma isomer can settle out and the liquor, substantially free from crystals, is taken off from the top of the vessel (10) and returned to the circulating stream at the point 11.

Periodically a sludge of fine crystals is removed from the base of the separator via the cock 13. Similarly coarse crystals of the gamma isomers are tapped off from the base of the crystallizer via the cock 15 to enter a second separator having the form of a filter or sieve at the point 16. The coarse gamma crystals are retained on the sieve 17, whence they are periodically removed (20), and the liquor is returned from the base of the separator (18) to rejoin the circulating stream at the point 19. Preferably the gamma crystals are washed with a little solvent and then dried, the wash liquor being conveniently returned to the system by using it as part of the solvent in which the material to be purified is introduced into the system at the point 1.

It will be appreciated that as additional solvent is being constantly added to the system in the form of the solution introduced at point 1, it is necessary to provide for its removal at some other point or points in the system. Also since the feed solution contains not only the alpha, beta and gamma isomers, but also delta isomer and impurities formed in the chlorination reaction, a purge must be provided to eliminate these, because if they are allowed to build up to too high a concentration they so affect the solubility relationships and/or the crystallization habits of the alpha, beta and gamma isomers as to destroy the delicate balance upon which the separation of the gamma depends. For these reasons part of the solution leaving the separator that removes the alpha and beta crystals (9) is purged from the system at the point 12 via the cock 14.

Clearly this purged solution will not only contain delta isomer and impurities but will also be saturated with alpha, beta and gamma isomers. These products may be recovered by evaporating the solution and the solvent may then be returned to the system by using it as the vehicle for the hot concentrated solution in which the material to be purified is introduced into the system.

Using a system of this type with a feed solution of composition—alpha isomer 16.0 parts, beta isomer 5.4 parts, gamma isomer 55 parts, delta isomer 27.5 parts, impurities 13.8 parts, methanol 382.3 parts (all parts being by weight) entering the system at a temperature of 50° C. and at the rate of 500 grams per hour, with a cooler adequate to bring the solution to 20° C. on entering the crystallizer, it has been found possible to work a continuous process yielding 26 grams per hour of gram crystals of 98% purity together with 12.7 grams per hour of mixed fine crystals of average composition—alpha isomer 8 parts, beta isomer 2.7 parts, gamma isomer 2.0 parts, and a delta purge amounting to 461.3 parts per hour containing all the delta isomer and impurities, very little alpha and beta isomers and less than 0.25 part of gamma isomer for each part of delta isomer.

The volume of the crystallizing zone was 2 litres and that of whole circulating solution 10 litres.

In another run, employing a similar apparatus, benzene was used as the solvent. Crude benzene hexachloride of composition—alpha isomer 272 parts, beta isomer 30 parts, gamma isomer 50 parts, delta isomer 28 parts and impurities 20 parts was stirred with 176 parts of benzene at 15° C. The mixture was then filtered, whereby there was produced a solution containing alpha isomer 18.8 parts, beta isomer 2.5 parts, gamma isomer 43.2 parts, delta isomer 22.4 parts, impurities 13.1 parts and benzene 156 parts. This solution was then passed at the rate of 455 parts per hour to an evaporator where 237.5 parts per hour of benzene were distilled off. The resulting hot concentrated solution was fed at the rate of 217.5 parts per hour into the main circulating stream which consisted of 10,000 parts (by volume) of a solution in benzene, saturated at 18° C. with alpha, beta, gamma and delta isomers. The fortified stream then passed on through the cooler where it was brought to 18° C. and into the crystallizer which held in suspension some 550–700 parts of gamma crystals. The gamma isomer was deposited at the rate of 20 parts per hour in the form of crystals of 2 to 3 mm. diameter and purity >98%. The fine crystals isolated from the fine crystal separator varied somewhat in composition and contained from 62% to 78% of gamma isomer, the rest being alpha isomer with a small proportion of beta isomer. The delta purge had an average composition, alpha isomer 21.5 parts, beta isomer 2.7 parts, gamma isomer 30 parts, delta isomer 29.2 parts, impurities 16.6 parts and benzene 58 parts. The system had not fully settled down to steady operating conditions when the run was stopped. The results however show that the process will operate with benzene, though not so efficiently as with methanol.

In the foregoing description all parts are by weight except where otherwise indicated and the relationship of parts by weight to parts by volume is that of the kilogram to the litre.

Figure 2:
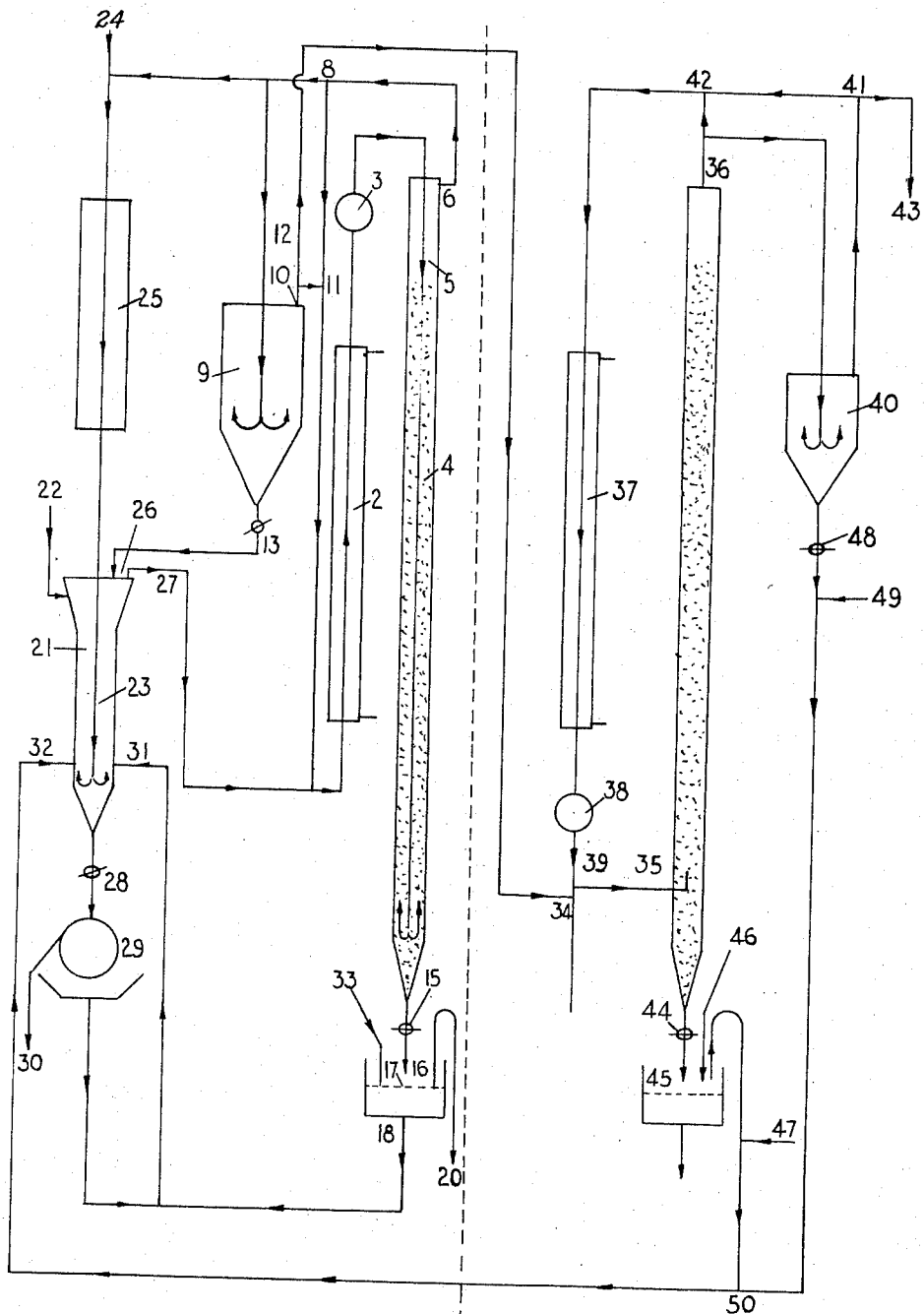

In the system just described, fortification of the circulating stream is brought about by injecting into it a hot concentrated solution of the material to be purified. A suitable starting material for such a process is, for example, a primary concentrate obtained by eliminating a substantial proportion of the alpha and beta isomers from the total chlorination product. On the other hand, the portion of Figure 2 shown to the left of the dotted line illustrates a flowsheet for a system wherein the feed material is the total crude chlorination product, the step of making the concentrate being integrated with the procedure already described for separating the gamma isomer from the other isomers and impurities. Like portions of the system are numered as in Figure 1.

Thus 2 is a cooler and 4 is the classifying crystallizer into the base of which the crystallizing solution is introduced by the pump 3. The rate of flow of the solution is so adjusted that the level of the fluidized bed of crystals is stabilized at the point 5, some way below the top of the crystallizer. The spent solution, carrying with it the fine crystals of alpha and beta and some fine gamma crystals leaves from the point 6 and is recirculated through the cooler and pump to the crystallizer. At the point 8 the stream is divided, part of the liquor and crystals being diverted to the fine crystal separator 9. Here the rate of flow is diminished so that the crystals settle to the bottom and the liquor, substantially free from crystals, is taken off from the top of the vessel (10) and returned to the main circulating stream at the point 11.

The purge that carries away the delta isomer is bled off from the system at the point 12.

Coarse crystals of the gamma isomer, together with some liquor, are tapped off from the base of the crystallizer via the cock 15 to enter a separator conveniently having the form of a filter or sieve at the point 16. The crystals are retained on the sieve 17, where periodically they are washed with a little solvent (shown entering at 33) and then removed (20) and the mother liquor and wash liquor are taken from the base of the separator (18) to be returned to the system.

The vessel 21 is an extractor which is held at a temperature considerably above that at which the crystallizer operates and which preferably is worked on the fluidized bed principle. It is fed periodically at the point 22 with the coarsely crystalline crude chlorination product from which it is desired to extract the gamma isomer and is also fed through the pipe 23 (which opens near the base of the vessel) with a part of the spent solution leaving the top of the crystallizer (6). Additional "make-up" solvent joins this incoming stream at the point 24 and it then passes through the heater 25 before entering the extractor. The extractor is further fed periodically at the point 26 with a sludge of fine crystals that is tapped off from the bottom of the fine crystal separator via the cock 13. The crystalline material in the base of the extractor is subjected to the solvent action of the hot solution entering by pipe 23 and in consequence the very soluble delta isomer and impurities, the gamma isomer and part of the alpha and beta isomers pass into solution, so that a hot solution saturated with alpha, beta and gamma isomers and bearing away also the delta isomer and impurities passes away from the top of the extractor by pipe 27 and joins the main circulating stream before this enters the cooler 2. When the gamma isomer has been extracted from the solids in the vessel 21 the residual slurry is discharged, via the cock 28, on to the rotary filter 29. The solids are eliminated (3) as an "alpha residue" and the liquor and washings joined by those coming from the gamma separator 16 are returned to the extractor at the point 31. The fifth feed to the base of the extractor (32) should be ignored for the moment; it operates only when the system is integrated with a further device, to be described later, for recovering some of the gamma isomer that has been inevitably eliminated in the delta purge.

As already indicated the processes described above yield two products besides the purified gamma crystals and one of these, namely, the delta purge, contains appreciable proportions of gamma isomer. There are some applications for which such a product is directly useful but it is a desirable industrial objective to improve the economic efficiency of the process as a whole by providing some means for separating out the delta isomer and impurities from this purge and returning as much as possible of the gamma isomer (usually unavoidably accompanied by alpha isomer) to the main circulating system. The provision of such means for recovery of gamma isomer, integrated with the main extraction process, is a further feature of the invention which is now to be described.

It has been mentioned earlier that the ratio of the solubilities of the gamma and delta isomers in the particular solvent utilized is the factor that controls the extent of the inevitable loss of gamma isomer in the delta purge and hence the choice of an appropriate solvent is important for the economic success of the process. Methanol is the solvent of choice, since it is cheap, is readily rectified and separated from water and from benzene and has adequate solvent power for the various benzene hexachloride isomers and a favorable delta/gamma solubility ratio. However, other solvents, of varied types, may also be used, though with widely varying efficiency. Thus there may be used, for instance, other alcohols such as ethanol, isopropanol or cyclohexanol, aromatic hydrocarbons such as benzene or toluene or esters such as dimethyl carbonate or diethyl carbonate. Aliphatic hydrocarbons are in general unsuitable as they lack adequate solvent power, whereas ketones and simple aliphatic esters such as ethyl acetate or butyl acetate have too great a solvent power, so that their saturated solutions tend to be intractable viscous syrups quite unsuitable for use as a circulating stream liquor. Chlorinated hydrocarbons such as methylene chloride, chloroform, ethylene dichloride or carbon tetrachloride have unfavorable delta/gamma solubility ratios.

It will be apparent that one way of recovering some of the gamma isomer lost in the delta purge from a crystallization system working with methanol as the solvent is to feed the product into a similar system working with a solvent that has a higher delta/gamma solubility ratio than methanol. Unfortunately some solvents that show an appropriate delta/gamma solubility ratio have other undesirable properties, for instance an inappropriate volatility or an inconveniently low gamma solubility figure which would necessitate the use of very large vessels and volumes of circulating solution. Isopropanol, for instance, has a favorable delta/gamma solubility ratio and a reasonable gamma solubility figure but unfortunately it readily picks up water from the atmosphere and the azeotrope water/isopropanol has a low gamma solubility and so would call for large volumes of circulating liquor. A solution of the problem of gamma recovery has therefore been sought along the lines of changing or debasing the solvent in the delta purge in some way so as to improve its delta/gamma solubility ratio and yet leave it in such a condition that it can be readily rectified and returned for re-use in the main system. In the case of methanol this change is conveniently achieved by dilution with water. The mixture of 80% methanol with 20% water has a delta/gamma solubility ratio of 5.56 and a gamma solubility figure of 1.2 grams per 100 grams of solvent mixture and when finally recovered can be rectified by distillation with reasonable ease and efficiency to give methanol suitable for re-use in the first stage of the process.

The delta purge recovery unit also utilizes a further phenomenon that has been discussed above, namely, the observation that if the degree of supersaturation of the solution fed to the crystallizer is unduly increased the crystals tend to agglomerate and form granular aggregates. This apparently unfavorable effect, coupled with the device of debasing the solvent, is utilized and turned to advantage in the recovery unit that is illustrated in the right-hand portion of Figure 2.

The initial delta purge, eliminated from the first stage of the process at the point 12, enters the recovery unit at 34 where there are injected 20 parts of water for each 80 parts of methanol contained in the purge. The supersaturated solution so produced then enters the base of the classifying crystallizer at the point 35. Here, since the degree of supersaturation is relatively high (for instance 0.4% of gamma isomer in supersaturation) the coarse crystals formed are less pure than in the first part of the process. A typical product is, for instance, 80% gamma, 20% alpha and the crystals agglomerate and form granular aggregates. As in the earlier stage, the solution carrying the fine crystals leaves the top of the crystallizer (36) and returns via the heat exchanger 37 and the pump 38 to the point 39 where it joins the water-diluted purge and returns to the base of the crystallizer. Again as in the earlier stage, a portion of the stream of solution and fine crystals leaving the top of the crystallizer is by-passed through a separator 40 where fine crystals are deposited. The outflow from the top of the separator is divided at the point 41, part of the solution being returned to the main circulation at the point 42, while a proportion, carefully adjusted so that it carries away in unit time just so much delta isomer and impurities as are introduced in that same time in the feed solution in the line 12—34, is finally eliminated from the system (43). This final purge is then evaporated to yield a "delta residue" and the solvent is condensed and then rectified and returned to the first stage of the process. For obvious reasons of economy this final delta purge is not operated until the delta content of the solution leaving the crystallizer has built up to saturation point.

As before, the purged solution will be saturated with alpha and gamma isomers as well as with delta, but owing to the change in the solvent the actual concentration of gamma isomer is less and much of the gamma content of the first-stage purge is recovered in the granular solid that collects at the base of the crystallizer. Periodically this is tapped off, together with some solvent, via the cock 44 and passed to the sieve 45. The granules remain on the sieve where they are washed with a little methanol (46) to displace the aqueous methanol retained thereon. They are then dissolved in methanol, shown as entering the system at 47, and the solution is fed back to the initial extractor (21) at the point 32. Similarly the fine crystals that collect in the separator 40 are tapped off from time to time via the cock 48, dissolved in methanol, shown entering the system at the point 49, and in this way sent to join, at the point 50, the stream of fluid returning to the extractor 21.

In working a recovery unit of this type, the function of the heat exchanger 37 depends on the particular solvent employed and the diluent used to debase it. If heat is generated by the mixing of the two solvents the heat exchanger is employed as a cooler; if on the other hand heat is absorbed on mixing, this may be compensated by using the vessel 37 as a heater. In some cases, it is possible to dispense with the heat exchanger and rely on controlling the heat input by regulating the temperature of the diluent that is fed in at the point 34.

The utlimate products obtained from this combined process are thus the pure gamma crystals (20), which are 98% pure, the "alpha residue" leaving the rotary filter (30) which is simply alpha and beta isomers with at most 1% of gamma, and the ultimate "delta purge" (43) which contains all the delta isomer and impurities, very little alpha and beta isomers and less than 0.2 part of gamma isomer for each part of delta isomer.

As has been indicated earlier, the degree of purity of the gamma product that can be achieved by this process depends, for any given solvent, on the degree of metastable supersaturation prevailing in the circulating steam as it enters the crystallizer and this latter factor is in turn dependent on the proportion of delta isomer and impurities present in the circulating liquor. Higher concentrations of delta isomer and impurities permit a greater degree of supersaturation and this enables one to obtain a greater output from a given size of plant, but only at the expense of the purity of the product. Conversely, smaller proportions of delta isomer and impurities allow of the production of a purer gamma product, but at the cost of a diminished output from the plant. Moreover, a gamma product of, for instance, 95% purity can be upgraded to 99% or over by a relatively simple extraction procedure utilizing fresh solvent and the extract can be recycled and used in preparing the concentrated solution that is used to fortify the circulating stream liquor. Therefore, starting with any given crude source of gamma isomer, the process which offers the greatest overall economy in making gamma of purity 99% or over may not be that which yields immediately a 98%–99% gamma product settling out at the base of the crystallizer. For this reason processes utilizing a relatively high concentration of delta isomer and impurities in the circulating liquor have also been investigated.

In the two systems described in detail hereinabove the circulating liquor contained about 10% of delta isomer and impurities and the gamma product, after simple washing on the sieve to remove adhering mother liquor was of 98% purity. In another system, now to be described, which uses 33% of delta isomer and impurities in the stream liquor, we start with a crude chlorination product containing 67.1% of alpha isomer, 8.0% of beta, 13.15% of gamma and the remaining 11.75% delta isomer and impurities and we produce therefrom a gamma product of 99% purity, an alpha residue containing 88.5% of alpha isomer, 10.4% of beta and 1.1% of gamma and a delta residue containing 11.4% of alpha isomer, 2.4% of beta, 14.3% of gamma and 71.9% of delta isomer and impurities.

The plant consists of the usual arrangement of cooler, crystallizer, fine crystal separator and pump, together with a system comprising a desaturator, an extractor, a filter and an evaporator which together provide the feed solution and a further ancillary system to separate, upgrade and dry the gamma product.

The extractor is fed with 414 parts per hour of a crude chlorination product containing 277.7 parts of alpha isomer, 33 parts of beta, 54.6 parts of gamma, 48.7 parts of delta isomer and impurities and perhaps a trace of unconverted benzene. It also receives a solution coming from the desaturator, a solution coming from the washing of the gamma product, spent solution from the fine crystal separator and recovered methanol from the evaporator, all of which will be more fully described hereinafter.

From the extractor, which can be of quite simple design and which operates at ordinary temperature, there passes to the filter a slurry which is there separated into 304 parts of a solid alpha residue of the composition given above and a solution consisting of alpha isomer 76.3 parts, beta isomer 30.5 parts, gamma isomer 165 parts, delta isomer and impurities 411 parts and methanol 1650 parts.

This solution passes to a simple evaporator, where 950 parts of methanol are evaporated off, the residual hot solution then serving as the fortifying solution and entering the crystallizer unit, passing in turn through the cooler, crystallizer, fine crystal separator and pump.

The fine crystal separator serves its usual purpose of eliminating from the circulating stream a controlled proportion of the fine crystals, so preventing the development of an undesirably high number of crystallization nuclei. However, with the high delta concentration employed, only very small quantities of fine crystals are in fact deposited in the separator and it matters little whether these are separately isolated or passed forward with the usual purge liquor to the desaturator.

By reason of the high degree of supersaturation employed, the liquor coming away from the fine crystal separator as a delta purge is still heavily supersaturated in all the isomers. It contains, in fact, 72.2 parts of alpha isomer, 30.4 parts of beta, 109.5 parts of gamma, 407 parts of delta isomer and impurities and 696 parts of methanol. It is therefore split into two portions, one being returned immediately to the extractor, while the other passes to the desaturator.

This is simply a large vessel provided with every simple stirring in which this fraction of the solution remains at ordinary temperature long enough for the whole of the supersaturation to be released. Periodically the stirring is stopped and a portion of the solution, now merely saturated with the various isomers, is removed by decantation. The fraction of the purge liquor passed into the desaturator and the fraction of that decanted off are so controlled that the decanted liquor carries away in unit time just so much of the delta isomer and impurities as are in that same period of time introduced into the system in the crude chlorination product that is fed into the extractor.

Thus, for instance, the purge liquor coming from the fine crystal separator can be divided in a ratio of about one quarter to three quarters, so that there passes to the desaturator a solution consisting of 17.7 parts of alpha isomer, 7.5 parts of beta, 27 parts of gamma, 100 parts of delta isomer and impurities and 171 parts of methanol, the rest of the purge liquor passing direct to the extractor as already described. Of this material passing to the desaturator there is removed by decantation each hour an amount of saturated solution containing 48.7 parts of delta isomer and impurities and so also containing 7.7 parts of alpha isomer, 1.6 parts of beta, 9.7 parts of gamma and 83.2 parts of methanol. The rest of the material remaining in the desaturator is then discharged, in the form of a slurry, into the extractor. As will be appreciated, there is nothing critical about the ratio one quarter to three quarters that we have here adopted; a smaller fraction of the liquor could be passed to the desaturator and still provide for the eventual decantation of solution that will carry away 48.7 parts of delta isomer and impurities.

This final delta purge solution is then passed to a still where the methanol is stripped out and the syrupy delta residue so obtained, consisting of 11.4% of alpha isomer, 2.4% of beta, 14.3% of gamma and 71.9% of delta isomer and impurities, constitutes the second of the three ultimate products that leave the plant.

For convenience, to assist in maintaining a balance of the amount of methanol in the system and also to provide a point where any benzene carried into the system with the initial crude chlorination product can be eliminated, part of the methanol that was evaporated off in the simple evaporator already described is passed with the delta purge solution to the still. Here it is rectified and made fit to be returned to the system as part of the liquor that is used in washing the gamma product which is now to be described.

The gamma product which accumulates at the base of the crystalliser is tapped off, intermittently or continuously, together with a small amount of the stream liquor. It is fed to a sieve and the liquor which passes through is returned to the circulating system. Because of the high degree of supersaturation of the solution from which it is deposited, the product is in the form of granules, instead of dense crystals, a fact which considerably facilitates the final purification. After a simple extraction with methanol the product is filtered, washed with more methanol to remove adhering mother liquor and then dried. The methanol extract and wash liquors are recycled as previously described to the extractor. The dried gamma product, produced at the rate of 42 parts per hour, is of 99% purity.

Clearly, by its very nature, a process such as this can never yield a gamma product that is 100% pure. Nevertheless, by including a final extraction or washing step, products of purity 99% or over can be reliably obtained. Moreover the process is very flexible and less pure products can easily be made if desired. Indeed the process provides a flexible and controlled means of achieving the refining or beneficiation of mixtures of benzene hexachloride isomers to almost any gamma content that is desired.

What I claim is:

1. A process of separating gamma isomer from a mixture of benzene hexachloride isomers containing at least the alpha and gamma isomers which comprises the steps of bringing a continuous flow of a solution of a mixture of benzene hexachloride isomers to a state of metastable supersaturation in respect of at least the gamma isomer, continuously introducing the metastable supersaturated solution into the lower portion of a crystallization vessel containing a large surface of gamma crystals, the rate of introduction of said metastable supersaturated solution into said vessel being such as to maintain crystals in said vessel in suspension and classify said crystals while substantially isothermal crystallization takes place therein, removing spent solution and relatively fine crystals from the upper portion of said vessel, and removing relatively coarse crystals of separated gamma isomer from the lower portion of said vessel.

2. A process as defined in claim 1, including the further steps of dividing the flow of spent solution into two portions, separating crystals from one of said portions and then uniting the two portions, fortifying the reunited flow of spent solution by introducing thereinto at controlled rate a fresh mixture of benzene hexachloride isomers, and recycling the fortified solution to the supersaturating step.

3. A process as defined in claim 1, including the further steps of dividing the flow of spent solution into two portions, separating crystals from one of said portions and then uniting the two portions, fortifying the reunited flow of spent solution by introducing thereinto at controlled rate a fresh solution of a mixture of benzene hexachloride isomers, and recycling the fortified solution to the supersaturating step.

4. A process as defined in claim 1, including the further steps of dividing the flow of spent solution into two portions, separating crystals from one of said portions and then uniting the two portions, fortifying the reunited flow of spent solution by introducing thereinto at controlled rate a fresh solution of a mixture of benzene hexachloride isomers, the concentration and temperature of said fresh solution being higher than the concentration and temperature of the spent solution, and recycling the fortified solution to the supersaturating step.

5. A process as defined in claim 1, including the further steps of heating at least part of the flow of spent solution, fortifying the heated flow of spent solution by introducing thereinto a fresh mixture of benzene hexachloride isomers, and recycling the fortified solution to the supersaturating step.

6. A process as defined in claim 1, including the further steps of heating at least part of the flow of spent solution, passing the heated flow of spent solution upwardly through an extraction vessel at controlled rate whereby crystals are maintained in suspension in said extraction vessel, feeding a coarsely crystalline fresh mixture of benzene hexachloride isomers into said extraction vessel, removing gamma isomer fortified solution from the upper portion of said extraction vessel and recycling said fortified solution to the supersaturating step, and removing gamma isomer-free crystals from the lower portion of said extraction vessel.

7. A process as defined in claim 1, wherein a fraction of the spent solution is withdrawn from the system to maintain the level of delta isomer and impurity concentration therein.

8. A process as defined in claim 1, including the further steps of separating at least some of the crystals from the flow of spent solution, then withdrawing a fraction of the spent solution from the system to maintain the level of delta isomer and impurity concentration therein, fortifying the spent solution by introducing thereinto a fresh mixture of benzene hexachloride isomers, and then recycling the fortified solution to the supersaturating step.

9. A process as defined in claim 1, wherein the solvent used is methanol.

10. A process as defined in claim 1, including the further steps of withdrawing a fraction of the spent solution from the system to maintain the level of delta isomer and impurity concentration therein, and recovering gamma isomer from said withdrawn fraction by altering the solvent thereof to increase its delta/gamma solubility ratio, and then precipitating gamma isomer-rich crystals from said altered solution.

11. A process as defined in claim 1, including the further steps of withdrawing a fraction of the spent solution from the system to maintain the level of delta isomer and impurity concentration therein, altering the solvent of said withdrawn fraction to increase its delta/gamma solubility ratio, bringing the altered solution to a metastable state of supersaturation, passing the supersaturated altered solution upwardly through a recovery vessel at controlled rate whereby crystals are maintained in suspension in said vessel and substantially isothermal crystallization takes place therein, removing spent solution and relatively fine crystals from the upper portion of said recovery vessel, and removing relatively coarse gamma isomer-rich crystals from the lower portion of said vessel.

12. A process as defined in claim 1, including the further steps of withdrawing a fraction of the spent solution from the system to maintain the level of delta isomer and impurity concentration therein, altering the solvent of said withdrawn fraction to increase its delta/gamma solubility ratio, bringing the altered solution to a metastable state of supersaturation, the degree of supersaturation being greater than that of the primary process step, passing the supersaturated altered solution upwardly through a recovery vessel at controlled rate whereby crystals are maintained in suspension in said vessel and substantially isothermal crystallization takes place therein, removing spent solution and relatively fine crystals from the upper portion of said recovery vessel, and removing relatively coarse gamma isomer-rich crystals from the lower portion of said vessel.

(References on following page)

References Cited in the file of this patent

UNITED STATES PATENTS

| | | |
|---|---|---|
| 689,167 | Coleman | Dec. 17, 1901 |
| 2,699,456 | Kimball et al. | Jan. 11, 1955 |
| 2,767,224 | Kimball | Oct. 16, 1956 |

FOREIGN PATENTS

| | | |
|---|---|---|
| 709,127 | Great Britain | May 19, 1954 |

OTHER REFERENCES

Svanoe: "Industrial and Engineering Chem.," vol. 32, pp. 636–639 (1940).